United States Patent [19]

Yoshioka et al.

[11] Patent Number: 5,259,119

[45] Date of Patent: Nov. 9, 1993

[54] AUTOMATIC INNER DIAMETER MEASURING APPARATUS AND ZERO ADJUSTMENT THEREOF

[75] Inventors: Susumu Yoshioka; Tetsuhiko Kubo; Tadao Nakaya, all of Utsunomiya, Japan

[73] Assignee: Mitutoyo Corporation, Tokyo, Japan

[21] Appl. No.: 742,650

[22] Filed: Aug. 8, 1991

[51] Int. Cl.⁵ .............................. G01B 3/26; G01B 3/34
[52] U.S. Cl. ............................... 33/502; 33/542.1; 33/542; 73/1 J
[58] Field of Search ............... 33/503, 542, 544.5, 33/542.1, 548, 544, 502; 73/1 J

[56] References Cited

U.S. PATENT DOCUMENTS

| | | | |
|---|---|---|---|
| 3,750,295 | 8/1973 | Noromann et al. | 33/503 |
| 3,889,380 | 6/1975 | Albertazzi | 33/548 |
| 4,412,385 | 11/1983 | Selleri | 33/542 |
| 4,631,834 | 12/1986 | Hayashi et al. | 33/503 |
| 4,653,196 | 3/1987 | Moschner et al. | 33/544.5 |
| 4,753,555 | 6/1988 | Thompson et al. | 33/542 |
| 4,796,363 | 1/1989 | Rutter et al. | 33/542 |
| 4,872,269 | 10/1989 | Sattmann | 33/542 |
| 5,095,634 | 3/1992 | Overlach et al. | 33/544.5 |

FOREIGN PATENT DOCUMENTS

3823373 1/1990 German Democratic Rep. ... 33/503
8806948 9/1988 PCT Int'l Appl. ............... 33/503

*Primary Examiner*—Thomas B. Will
*Attorney, Agent, or Firm*—Flynn, Thiel, Boutell & Tanis

[57] ABSTRACT

An automatic inner diameter measuring apparatus which includes an inner diameter measuring gauge head having at least one contacting element capable of being inserted into bores of an object to be measured and moving in a radial direction of the bore. A stocker is provided which is capable of holding a plurality of inner diameter measuring gauge heads corresponding to different diameters. A three-dimensional moving instrument is provided for detachable coupling with the inner diameter measuring gauge head to facilitate a three-dimensional movement with reference to the object to be measured and the inner diameter measuring gauge. A drive device for the three-dimensional moving instrument is provided. A plurality of master ring gauges supported on a ring gauge support are provided to set an inner diameter measuring gauge head attached thereto to zero.

6 Claims, 6 Drawing Sheets

AUTOMATIC INNER DIAMETER MEASURING APPARATUS AND ZERO ADJUSTMENT THEREOF

BACKGROUND OF THE INVENTION

1. Field of the Invention

This invention relates to an automatic apparatus for measuring bores and other objects to be measured.

2. Description of the Related Art

A coordinate measuring instrument is known as an apparatus which moves its touch probe toward a three-dimensional object to measure any point on the object and then processes the measured data.

The coordinate measuring instruments can be categorized, by its operation type, into a manual type, a motor-drive type, a CNC (Computer Numerical Control) type and the like.

By the way, such a high precision conventional coordinate measuring instrument is generally placed in a special room, usually separate from a production line for the objects, in which the temperature and the humidity are kept constant. It is therefore necessary for an operator to pick up and bring one object from the production line into the room for measurement.

According to the recent necessity of effective production, it is desired to provide a coordinate measuring instrument which may be set on the production line, so-called for an in-line measurement. The in-line measurement should have a capability of producing a fast and automatic measurement so as to not slow down the production speed.

On the contrary, the present coordinate measuring instrument needs to process three points of data for an inner diameter measurement of a bore by using its probe. The three data points may be used for define the center of the bore, but which is not ideal for a fast measurement of the inner diameter. And, the diameter may be processed with reference to a rather distant origin for the measurement, so that the accuracy of the measurement is likely to be bad.

It is often the case in in-line measurement devices to measure only the size of the bores, wherein the function to define the center position of the bore is just an unwanted one.

While, as one of inner diameter measuring devices, there are well-known manual hole-testers, for example those described in Japanese Patent Application Publication No. 63-4641 and Japanese Utility-model Application Laid-open No. 60-41811 and others. But these should be used manually, so that the operation efficiency may not be high especially in cases where many diameters exist and face have a different diameter.

The inventors have noted that in 70 to 80 percent of the incidents where objects are to be measured, the measurements of bores are not for the purpose of providing a center point and the distance between two of them but for the inner diameter.

Accordingly, in this field, it is desired to provide an instrument which may effectively measure the inner diameter of the bores, if necessary.

An object of the present invention is to provide an automatic inner diameter measuring apparatus capable of providing a fast measurement of an inner diameter and being used in an in-line measurement situation.

Another object is to provide a method of providing a fast zero adjustment of the automatic inner diameter measuring apparatus.

SUMMARY OF THE INVENTION

An automatic inner diameter measuring apparatus according to the present invention has an inner diameter measuring gauge head capable of measuring a diameter of a bore by one operation using its three-dimensional moving means as in the case of the conventional coordinate measuring instrument, so that the measurement for inner diameters may be performed thereby.

The automatic inner diameter measuring apparatus, according to the present invention, has: an inner diameter measuring gauge heads having at least one contacting element capable of being inserted into bores of an object to be measured and moving toward a radial direction of the bore; a stocker capable of holding a plurality of inner diameter measuring gauge heads corresponding to different diameters; a three-dimensional moving means for detachably catching the inner diameter measuring gauge head by a three-dimensional movement with reference to the object to be measured and the inner diameter measuring gauges; a drive means for the three-dimensional moving means; a plurality of master ring gauges capable of adjusting the inner diameter measuring gauge heads to zero thereof; and a ring gauge support capable of holding the master ring gauges.

In this apparatus, the ring gauge support is provided at the stocker, so that the center axis of the master ring gauge coincides with that of the inner diameter measuring gauge head kept on the stocker.

The method of zero adjustment for an automatic inner diameter measuring apparatus, according to this invention, has: an inner diameter measuring gauge heads having at least one contacting element capable of being inserted into bores of an object to be measured and moving toward a radial direction of the bore; a stocker capable of holding a plurality of inner diameter measuring gauge heads corresponding to different diameters; a three-dimensional moving means for detachably catching the inner diameter measuring gauge head by a three-dimensional movement with reference to the object to be measured and the inner diameter measuring gauges; a drive means for the three-dimensional moving means; a plurality of master ring gauges capable of adjusting the inner diameter measuring gauge heads to zero thereof; and a ring gauge support capable of holding the master ring gauges, so that the center axis of the master ring gauge coincides with that of the inner diameter measuring gauge head kept on the stocker, the method comprising the steps of: passing the contacting element of the inner diameter measuring gauge head through a corresponding ring gauge, when the gauge head is attached by the three-dimensional moving means; and automatically adjusting the measuring value of the inner diameter measuring gauge head into zero, when the contacting element passing through the ring gauge.

In this method, the contacting elements of the inner diameter measuring gauge head, kept in the stocker, are projected by a predetermined dimension from the corresponding master ring gauge, so that when the inner diameter measuring gauge head is attached to the three-dimensional moving means, and pulled up by a predetermined length, the measuring value of the inner diameter measuring gauge head is adjusted to zero.

In the present invention, when an inner diameter of a bore of an object to be measured is measured, the three-dimensional moving means is firstly moved with reference to the stocker to catch an inner diameter measuring gauge head corresponding to the bore.

The gauge head is then inserted into the bore and a moving distance of the contacting elements with reference to the zero adjusted gauge head is measured. In this end, if there are other bores which are capable to be measured by the same gauge head, they would be measured in due course. Other bores would then measured by another gauge head.

The used gauge head is then replaced by the corresponding gauge head between the three-dimensional moving means and the stocker as has been explained.

Accordingly, all of the bores in the object are measured by some preferable inner diameter measuring gauge head.

The zero adjustment of the gauge head is done by that the contacting elements are inserted into the corresponding master ring gauge and the out put value of the gauge head is adjusted to zero.

Incidentally, if the ring gauge support for the master ring gauge is provided in the stocker, when the gauge head is attached by the three-dimensional moving means, the contacting element should be inserted into the master ring gauge to thereby perform fast zero adjustment.

If the inner diameter measuring gauge head is kept on the stocker, when the contacting element is inserted into the master ring gauge by certain dimension to thereby easily adjust.

DETAILED DESCRIPTION OF THE PREFERRED EMBODIMENT(S)

Figure 1:
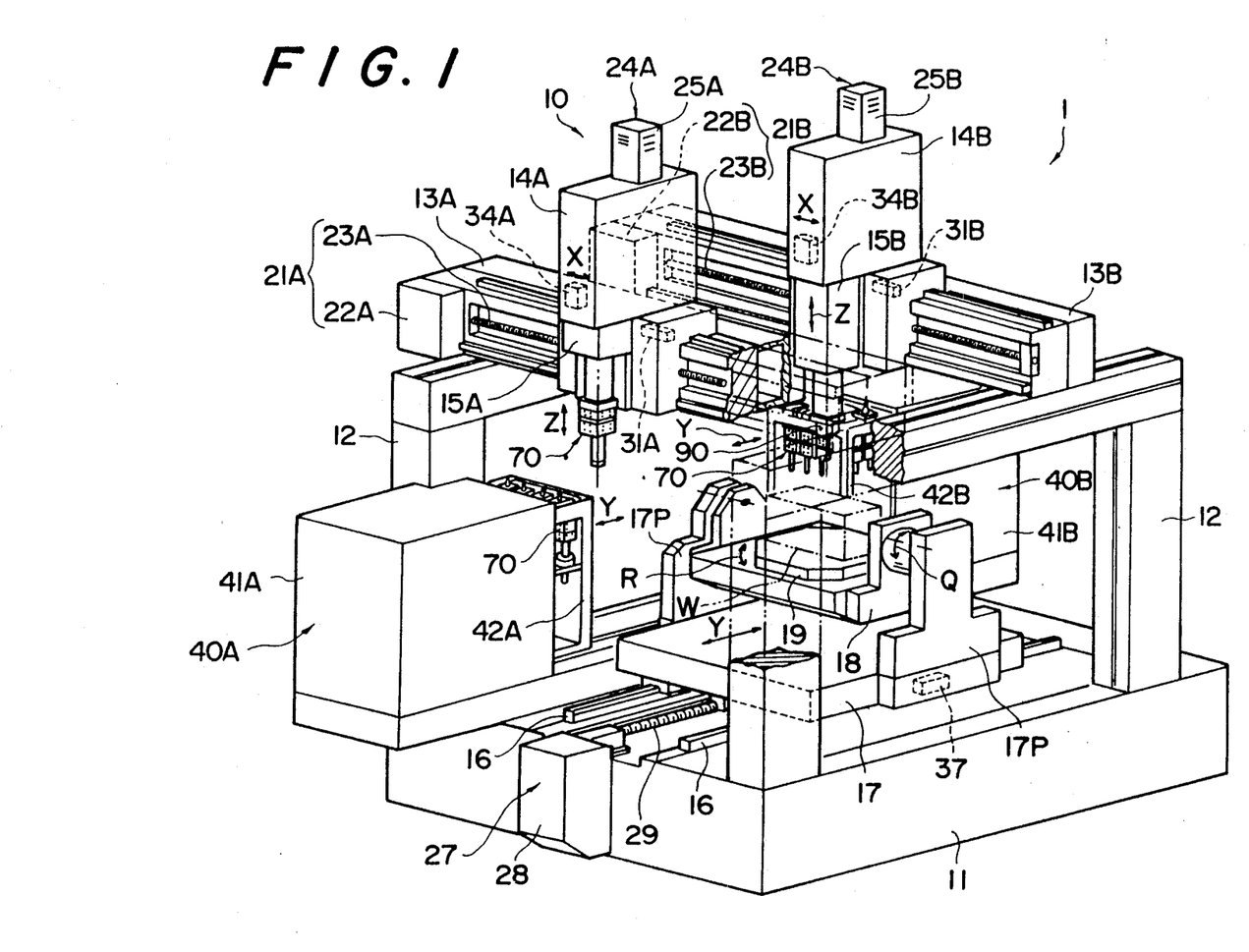
FIG. 1 is a partially sectioned view of the preferred embodiment of an automatic inner diameter measuring apparatus according to the present invention.

FIG. 1 shows a partially sectional view of an automatic inner diameter measuring apparatus 1 in accordance with the preferred embodiment.

The automatic inner diameter measuring apparatus 1 is capable of measuring the diameter, length, etc. of an object to be measured.

The automatic inner diameter measuring apparatus 1 comprises a base frame 11 and two gate-type columns 12, one of which is upstanding on one side of the base frame 11 and the other of which is upstanding on the other side of the base frame.

First and second cross beams 13A and 13B are mounted on and extend between the two columns 12 in a parallel state to each other. These beams 13A and 13B extend horizontally in a X-direction on the apparatus 1.

The cross beams 13A and 13B are respectively provided with X-sliders 14A and 14B moving in the X-direction. The reciprocal movements of the X-sliders 14A and 14B may be effected by first and second X-motors 22A and 22B provided at ends of the cross beams 13A and 13B and by first and second X-direction feed screws 23A and 23B extending entirely along the cross beams 13A and 13B.

Hereinafter, an assembly of the first X-motor 22A and the first X-direction feed screw 23A is called the first X-direction drive device 21A and the other assembly of the second X-motor 22B and the second X-direction feed screw 23B is called the second X-direction drive device 21B.

The above-explained first and second X-direction feed screw 23A and 23B can be recognized at the front sides of the cross beams 13A and 13B according to the drawing, but, in fact, they may be provided inside cases provide behind the cross beams 13A and 13B.

The displacement values, in the X-direction, of the first and second X-sliders 14A and 14B may be measured with first and second X-direction displacement detecting devices 31A and 31B which are provided between the cross beams 13A and 13B and the X-sliders 14A and 14B. The thus measured signals are inputted to a not-shown processing device such as a computer.

The X-direction displacement detecting devices 31A and 31B may be constructed with a glass-scale, magnetic-scale or capacitance-scale and a corresponding detector as in a generally known coordinate measuring instrument.

The X-sliders 14A and 14B are provided with first and second Z-sliders 15A and 15B which are capable of moving vertically along a Z-direction on the apparatus 1. The Z-sliders 15A and 15B may be moved reciprocally by first and second Z-direction drive devices 24A and 24B which are provided on the X-sliders 14A and 14B. The Z-direction drive devices 24A and 24B are constructed with the first and second Z-motors 25A and 25B on the X-sliders 14A and 14B are not-shown Z-direction feed screws.

The displacement values, in the Z-direction, of the Z-sliders 15A and 15B may be measured by first and second Z-direction displacement detecting device 34A and 34B which are provided between the X-sliders 14A and 14B and the Z-sliders 15A and 15B. The Z-direction displacement detecting devices 34A and 34B have the same construction as that of the X-direction displacement detecting devices 31A and 31B. The thus measured signals are also inputted to the processing device.

The Z-sliders 15A and 15B are so arranged that each of them detachably connects with an inner diameter measuring gauge head 70 or a touch probe 90, details of which will be described below.

Figures 2, 3:
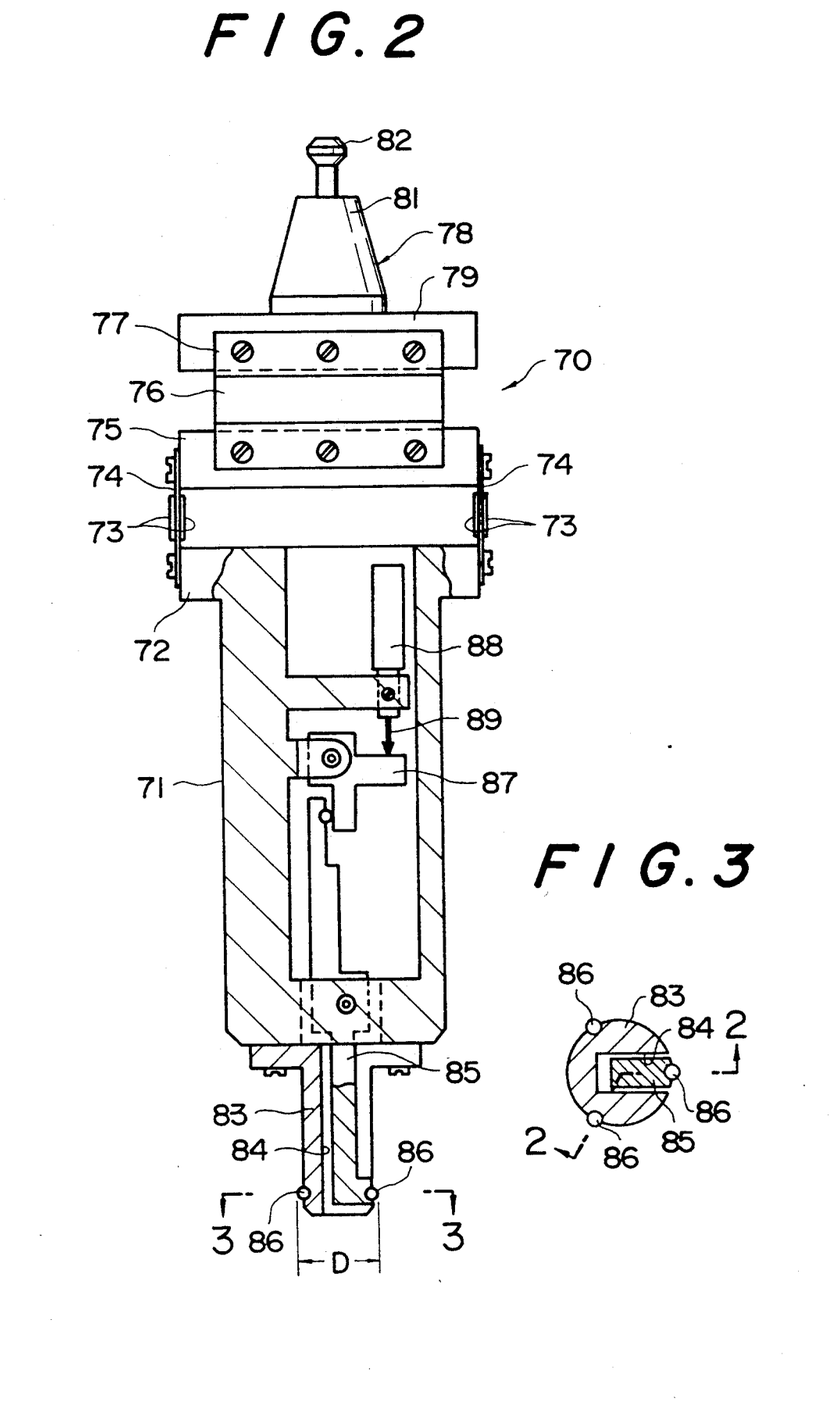
FIG. 2 shows an inner diameter measuring gauge head employed in the preferred embodiment, which is a partially sectional view taken along the 2—2 line in FIG. 3.
FIG. 3 is an enlarged sectional view taken along the 3—3 line in FIG. 2.

As shown in FIGS. 2 and 3, the inner diameter measuring gauge head 70 has a gauge body 71 in the shape of a cylinder at its bottom. A squared flange portion 72 is provided at the top of the gauge body 71 and is connected to a squared connecting plate 75 via a set of blade springs 74, each of which springs extend parallel to one another and has reinforcing plates 73 on both of it surfaces. The connecting plate 75 is further connected to a flange portion 79 of a shank 78 via a set of parallel blade springs 77, each of which has reinforcing plates 76 on both of its surfaces. Incidentally, the flange portion 79 is disposed on a line so as to intersect with the blade springs 74.

Accordingly, the shank 78 may move in a radial direction with reference to the axial direction of the gauge body 71, that is, under a so-called floating state. Otherwise, the shank 78 will maintain its position on the center line of the gauge body 71 caused by the two blade springs 74 and 77 as an urging device.

The shank 78 has a tapered portion 81 upstanding from the center of the flange portion 79 and a mushroom shaped pull-stud 82 projecting from the top of the tapered portion 81.

The gauge body 71 has, on its bottom portion, a fixed arm 83 which is formed into a cylindrical shape. The fixed arm 83 has an axially extending, side opening recessed region 84. Inside of the recessed region 84, the top portion of a movable arm 85 is positioned so as to swing with reference to a point located at the bottom portion of the gauge body 71.

On one circumference adjacent the tip portion of the fixed arm 83 and the movable arm 85, as shown in FIG. 3, there are provided with three contacting elements 86, consisting of three steel balls, each being spaced at an angle of 120 degrees from the other. Each of contacting elements 86 partially projects from the surface of the fixed arm 83 or the movable arm 85. Two of three contacting elements 86 are attached to the fixed arm 83 and the remaining one is attached to the movable arm 85. The contacting element 86 on the movable arm 85 is supported for movement in the radial direction of the fixed arm 83 according to the swing motion of the movable arm 85, that is, in the radial direction of a bore to be measured by the fixed arm 83.

The opposite end portion of the movable arm 85 may abut against one portion of a L-shaped swing piece 87 pivotal about a point on the gauge body 71. Another portion of the swing piece 87 may contact with a detecting element 89 of a displacement detector 88, such as a differential transformer, being disposed inside of the gauge body 71. The detecting element 89 is always urged to project downwardly by a spring not shown in the drawing. As has been described, the thus urging force pushes the swing piece 87 so that the tip portion of the movable arm 85 and its contacting element 86 are urged radially outwardly of the cylindrical fixed arm 83.

Incidentally, if the projection of the movable arm 85 due to the urging force from the detecting element 89 is insufficient for measurement, it would be preferable to optionally add a compressed or helical coil spring between the movable arm 85 and the gauge body 71.

It is obvious that the inner diameter measuring gauge head 70 could have a different shape, dimensions and the like corresponding to a bore to be measured, but still employ same component parts for its construction.

Figure 4:
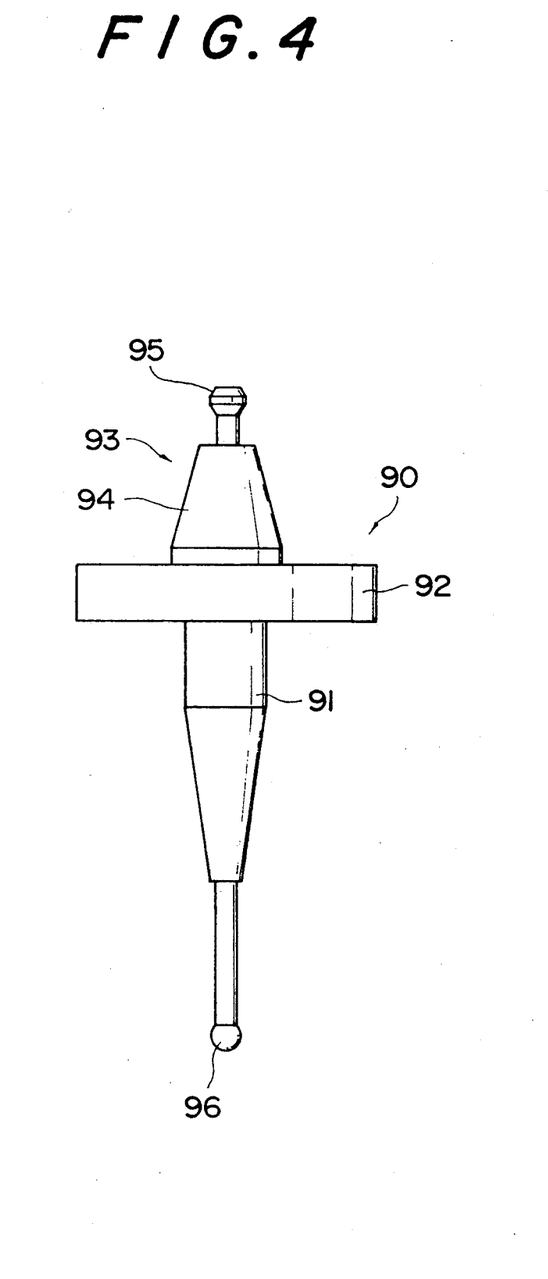
FIG. 4 is a front view of a touch probe used in the preferred embodiment.

The touch probe 90, as shown in FIG. 4, consists of a main part 91, a flange portion 92 and a shank 93 in this order as shown in FIG. 4. The shank 93 has a tapered portion 94 and a pull-stud 95. The configurations and dimensions of the tapered portion 94 and the pull-stud 95 are the same as the tapered portion 81 and the pull-stud 82 of the above-mentioned inner diameter measuring gauge head 70.

The lower portion of the main part 91 has a sphere contacting element 96 integrally provided thereon.

Incidentally, the touch probe 90 obviously can have a different shape and different dimensions corresponding to a portion of an object to be measured, but always has the same shank 93, as shown in FIG. 4, so as to render the probe usable in conventional coordinate measuring instruments such as a touch signal probe, an universal probe and the like.

The fundamental structure for connecting the inner diameter measuring gauge head 70 or the touch probe 90 with the Z-sliders 15A and 15B is exemplified in a publication of Japanese laid-open No. 61-213623.

Figure 5:
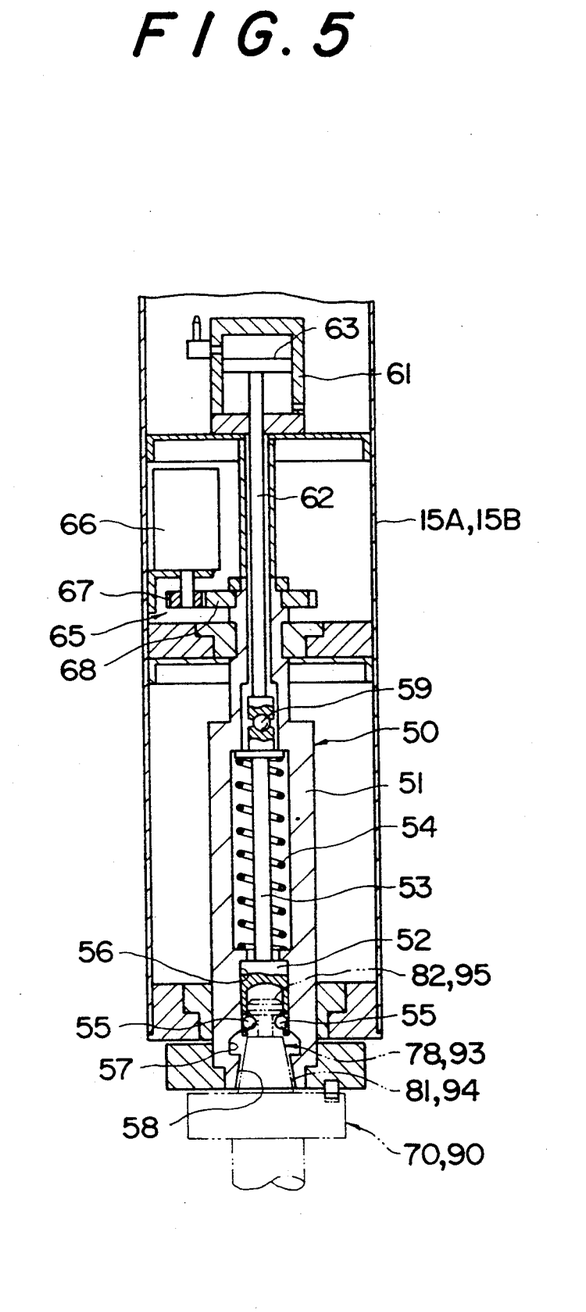
FIG. 5 is a sectional view showing a detachable system for the inner diameter measuring gauge head and the touch probe.

As can be recognized in FIG. 5, a detachable system 50 is employed in the Z-sliders 15A and 15B.

The detachable system 50 has a center axle 51 having a hollow portion thereinside. The center axle 51 is rotatable relative to the Z-sliders 15A and 15B and is also shiftable along its axis. The center axle 51 contains a drive shaft 53 which has a ball holder 52 at its one end in a state to move along its axis. The drive shaft 53 is always kept, by the compressed coil spring 54, under a condition retracted inside of the center axle 51.

The ball holder 52 has a plurality of radially movable balls 55. The balls 55 are collected into a ball holder 52, when the drive shaft 53 is retracted by the compressed coil spring 54 to place the ball holder 52 inside of an accommodation hole 56 of the center axle 51. Accordingly, the balls 55 are adapted to be received in a groove defined by a neck portion of the pull-stud 82 or 95 of the inner diameter measuring gauge head 70 or the touch probe 90 which is inserted into the ball holder 52, so that the pull-studs 82 and 95 are pulled to the inside of the center axle 51 without falling out.

Below the accommodation hole 56 of the center axle 51, a larger hole 57 than the hole 56 and a tapered hole 58 are successively provided. The configuration of the tapered hole 58 is formed so as to fit the shank 78 or 93 and the tapered portion 81 or 94, when the pull-stud 82 or 95 is pulled up by the balls 55 and the drive shaft 53.

The larger hole 57 has a rest space for the balls 55 with no-movement in the radial direction of the ball holder 52, when the drive shaft 53 is shifted downwardly against the force of the compressed coil spring 54. As explained above, the pull-stud 82 or 95 kept by the balls 55 in its neck portion would be detachable from the ball holder 52, when the movements of the balls 55 into the space 57 take place.

The upper portion of the drive shaft 53 is contacted with an end portion of a piston rod 62 of a cylinder 61 via a ball 59. The cylinder 61 is supported on the Z-sliders 15A or 15B. If a fluid is fed into an upper space in the cylinder 61 divided by a piston 63, the piston rod 62 is shifted downwardly and the drive shaft 53 is consequently moved against the compressed coil spring 54.

There is provided a center axle rotation system 65 for turning the center axle 51 in the Z-slider 15A or 15B. The center axle rotation system 65 comprises a motor 66 supported on the Z-slider 15A or 15B, a small gear 67, fixed to a drive shaft of the motor 66 and a big gear meshing with the small gear 67 and being fixed to the center axle 51.

If the center axle 51 is rotated by the center axle rotation system 65, the touch probe 90, which integrally connected to the center axle 51 via the ball holder 52 of the drive shaft 53, would be rotated. Hence, if the touch probe 90 is of a universal probe, the tilt direction of a supporting shaft of the contacting element 96, which has a certain angle with reference to the center axle of the probe 90, would be changed as desired, so that different inclined surfaces, other bores and the like should be measured.

As shown in FIG. 1, the table 17 is provided on the base frame 11 via a pair of rails 16 extending in a Y-direction perpendicular to the X-direction of the apparatus 1. Accordingly, the table 17 is to be a Y-direction slider.

Hence, a three-dimensional moving instrument 10 is organized with the X-sliders 14A and 14B moving in the X-direction along the cross beams 13A and 13B on the columns 12 upstanding from the base frame 11, the Z-sliders 15A and 15B provided on the X-sliders 14A and 14B so as in move to the Z-direction and the table 17 as the Y-slider moving in the Y-direction along the rails 16 on the base frame 11. If the inner diameter measuring gauge head 70 or the touch probe 90 is attached to the Z-slider 15A or 15B of the three-dimensional moving instrument 10, a three-dimensional measurement of an object W to be measured should be performed.

The Y-direction movement of the table 17 is facilitated by a Y-motor 28 provided on the base frame 11 and a Y-direction feed screw 29 extending along the Y-direction. Hence, a Y-direction drive device 2 is defined by the Y-motor 28 and the Y-direction feed screw 29.

The Y-direction displacement value of the table 17 is detected by a Y-direction displacement detecting device 37 provided between the table 17 and one of the rails 16 on the base frame 11. The Y-direction displacement detecting device 37 has the similar construction to the X-direction displacement detecting device 31A and 31B. The detected signal is inputted into the processing device.

The table 17 has a swing table 18 supported on a pair of brackets 17P upstanding from the table 17 in a state to swing by a desired angle of over 360 degrees, the direction of which is denoted by letter "Q" in the drawing, with reference to its horizontal axis.

The swing table 18 has a turn table 19 thereon in a state to rotate around a vertical axis of the table 17 by a desired angle of over 360 degrees, the direction of which is denoted by letter "R" in the drawing. Incidentally, if the swing table 18 is swung by certain angle, the turn table 19 would not turn around the vertical axis. However, the above explanation has done to make it simple, since the swing table 18 is kept flat in its primary position.

The turn table 19 is adapted to support the object W to be measured, which object has a plurality of bores.

The swing table 18 and the turn table 19 may be controlled by drive devices not shown such as motors to swing and rotated the object W. That is, the manner of placing the object W toward the inner diameter measuring gauge head 70 or the touch probe 90 attached to the Z-slider 15A or 15B is changeable.

Nearby the left column 12 on the base plate 11 as shown in FIG. 1, the first and the second stockers 40A and 40B are disposed so as to face each other.

Since the stockers 40A and 40B basically have the same construction, only the first stocker 40A will hereunder be described. But all members of the first stocker 40A will be denoted by adding the letter "A" and all members of the second stocker 40B will be denoted by adding the letter "B".

The first stocker 40A is mainly defined by a casing 41A, such as a box, one surface of which is opened and a mounting frame 42A movable in the Y-direction so as to go into and out from the casing 41A by a not-shown drive device.

Figure 6:
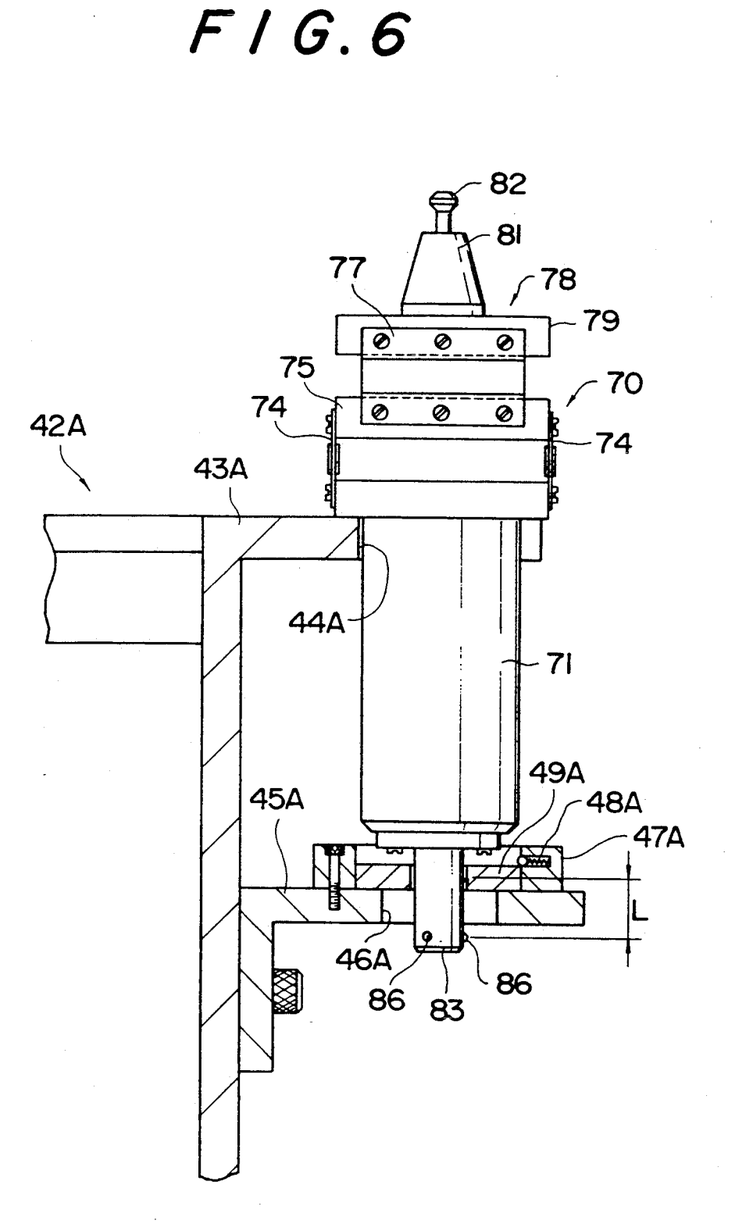
FIGS. 6 and 7 are, respectively, a sectional view and a perspective view showing the stocker.
Figure 7:
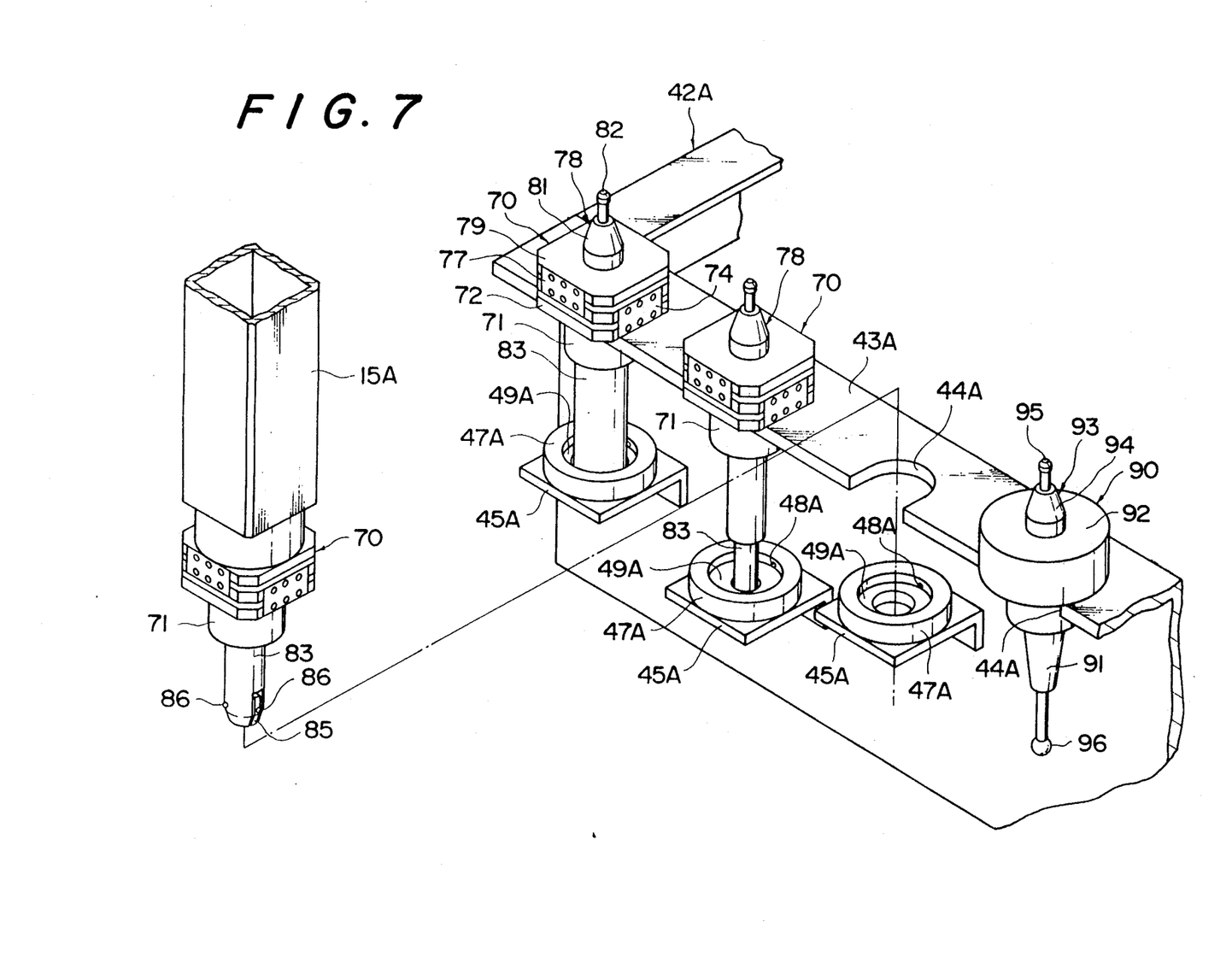

The mounting frame 42A has a reversed, L-shaped mount 43A as shown in FIGS. 6 and 7. The mount 43A is provided with several U-cut notches 44A at spaced intervals. The dents 44A may hold several kinds of the inner diameter measuring gauge heads 70 by their gauge body 71 and the touch probes 90 by their main body 91. Consequently, either the gauge head 70 or the probe 90 is supported by its flange portion 72 or 92 which abuts the upper surface of the mount 43A.

Below each dent 44A and for supporting each inner diameter measuring gauge head 70, a reversed, L-shaped ring gauge support 45A is provided. The ring gauge support 45A has a hole 46A on the extending center line of the fixed arm 83 of the inner diameter measuring gauge head 70.

The ring gauge support 45A has thereon a ring gauge holder 47A on the same center line of the hole 46A. The gauge holder 47A has, on its inner surface, a gauge holding device 48A comprising a plural set consisting of one ball, partially protruding from the inner surface of the gauge holder 47A, and a corresponding spring. Consequently, several mast ring gauges 49A may be detachably attached to the gauge holder 47A without falling out.

As may be seen from FIG. 6, if the inner diameter measuring gauge head is supported by the mount 43A, the top portion of the fixed arm 83 of the gauge head 70 would protrude downwardly through the master ring gauge 49A. Incidentally, a distance L, between the thickness center of the master ring gauge 49A and the exposed portion of the contacting elements 86 of the fixed arm 83 and the movable arm 85, is always kept constant, even though one inner diameter measuring gauge head 70 is changed to another one.

Since the mounting frame 42A or 42B of the stocker 40A or 40B may move reciprocally in the Y-direction, the Z-slider 15A or 15B of the three-dimensional moving instrument 10 may perform a three dimensional movement with reference to the inner diameter measuring gauge heads 70 or the touch probes 90 supported by the mounting frame 42A or 42B.

As may be seen from FIG. 2, the diameter D of a circumscribed circle, contacting with each contacting element 86 not forced, is slightly larger than an inner diameter of the corresponding master ring gauge 49A for the inner diameter measuring gauge head 70.

The automatic inner diameter measuring apparatus 1 according to the preferable embodiment is fundamentally organized as has been explained above. The operation of the apparatus 1 will be described hereunder.

At the beginning of the measurement by the automatic inner diameter measuring apparatus 1, the object W to be measured should be placed on the turn table 19. The preferable inner diameter measuring gauge head 70 and the touch probe 90 are primarily stocked in the stockers 40A and 40B.

When setting the inner diameter measuring gauge head 70, the corresponding master ring gauge 49A should be attached to the gauge holder 48A and the fixed arm 83 of the gauge head 70 is inserted into the ring gauge 49A.

If a predetermined bore of the object W is measured in accordance with a preliminary stored program, the inner diameter measuring gauge head 70, preferable to measure it, is connected to, for example, the first Z-slider 15A.

This connecting procedure is done by the X-direction drive device 21A for the first X-slider 14A, the Z-direction drive device 24A for the Z-slider 15A and the not-shown drive device for the mounting frame 42A of the first stocker 40A so that the center line of the first Z-slider 15A coincides with that of the inner diameter measuring gauge head 70. The piston rod 62 is urged down by feeding the fluid into the cylinder 61 of the detachable system 50 provided in the first Z-slider 15A so that the drive shaft 53 is shifted against the compressed coil spring 54. While keeping this situation, the Z-slider 15A moves downwardly to catch the pull-stud 82 of the gauge head 70 by the ball holder 52.

When the fluid feeding into the cylinder 61 is stopped, the shifted drive shaft 53 is replaced by the compressed coil spring 54 and the pull-stud 82 is pulled into the center axle 51, that is, the attachment of the gauge head 70 toward the Z-slider 15A is completed.

The Z-slider 15A goes up subsequently, so that the contacting elements 86 of the gauge head 70 pass through the inner surface of the master ring gauge 49A while contacting thereto. Incidentally, if the Z-slider 15A goes up by the distance L after catching the gauge head 70, the output value of the displacement detector 88 provided in the gauge body 71 is adjusted to zero in the processing device not shown.

The displacement detector 88 is electrically connected with the processing device when the inner diameter measuring gauge head 70 is attached to the Z-slider 15A. Since the diameter D of the circumscribed circle of the contacting elements 86 is larger than that of the ring gauge 49A, the contacting elements 86 always contacts with the inner surface of the ring gauge 49A, so that the perfect zero adjustment may be performed.

The thus zero-adjusted gauge head 70 attached to the Z-slider 15A is then inserted into the bore of the object W by the X-direction drive device 21A, the Z-direction drive device 24A and the Y-direction drive device 27 for the table 17. Incidentally, if there is a gap between the two central axes of the bore and the gauge head 70, the two sets of blade springs 74 and 77 would work for the smooth insertion of the fixed arm 83 and the movable arm 85 into the bore, because of the floating connection and the displacement from center between the gauge body 71 and the shank 78.

When the fixed arm 83 and the movable arm 85 are inserted into the bore, the contacting element 86 of the movable arm 85 is moved inwardly, so that the swing piece 87 shifts to switch the detecting element 89 of the displacement detector 88. The output value of the detector 88 is processed as the displacement value with reference to the inner diameter of the master ring gauge 49A.

This gauge head 70 should be used for the other bores. The measured values are then stored in the processing device and displayed by a printer not shown.

When the measurement of all the bores by one inner diameter measuring gauge head 70 is completed, the used gauge head 70 is changed with another one for other bores.

If all of the measurement by some gauge heads 70 are completed, the touch probe 90 is attached to the Z-slider 15A. Incidentally, the measurement by the touch probe 90 may be done before the measurement for the bores or intermediately for the effective measurement.

The measurement should not be done by only the first Z-slider 15A. The second Z-slider may be used intermediately for the saving of time when the gauge head 70 or the touch probe 90 is changed with another gauge head 70 or touch probe 90.

As has been explained, if the measurement at one surface of the object W is finished, the swing table 18 and/or the turn table 19 is moved by a predetermined angle, that is, 90 degrees in general, so that another surface to be measured may be shifted to be measured by the first or second Z-slider 15A, 15B.

If all of the surfaces are completely measured, the thus measured object W is removed and replaced with another one.

The following effects may be expected through the above embodiment.

Most of bore diameters made at the surfaces of the object W may be measured by one gauge head 70 capable of completing all of the measurement through one insertion, so that the necessary time for measurements should be made shorter. Since some bores, each having a similar diameter, may be measured by only one gauge head 70, the measurement time is shortened more. Hence, a so-called, in-line measurement of the object W may be done.

The measurement of the inner diameter measuring gauge head 70 is done while comparing with the corresponding master ring gauge 49A, so that the more precise measurement may be done than that by a general coordinate measuring instrument which inevitably moves on from the reference of the measurement.

The gauge head 70 has a structure in which the gauge body 71 is connected to the shank 78 via two sets of blade springs 74 and 77, so that the smooth insert of the gauge head 70 into a bore may be attained.

The zero adjustment of the gauge head 70 is automatically done when it is attached to the Z-spindle 15A or 15B and at every exchange thereof, the measurement is then performed effectively and precisely.

The stockers 40A and 40B may keep therein a plurality of the gauge heads 70 and the touch probes 0, so that only the bore measurement but also other measurements such as a distance measurement between two bores or between two surfaces, a whole shape and every dimension of an object may be performed.

Since the table 17 has thereon the swing table 18 and the turn table 19, it is not necessary to shift the object W for other surfaces measurement.

The present invention should not be limited to the embodiment described above but other modifications are naturally included in the present invention.

Taking for some instances, the object W used in the embodiment is enough to be measured at its bores, so that no touch probe 90 is needed. Incidentally, the movement process of the gauge head 70 is not always necessary to be done precisely but enough to insert the contacting elements 86 in a bore, so that the drive devices 21A, 21B, 24A, 25A, 27 and the displacement detecting devices 31A, 31B, 34B, 37 are not expected to have high accuracy, which may be inexpensively purchased.

The ring gauge support 45A for the master ring gauge 49A is not always needed to be provided at the mount 43A of the mounting frame 42A in the stocker 40A but may be provided on another mount. But, the above explained ring gauge support 45A may perform the zero adjustment of the gauge head 70 through the attachment process.

In the above embodiment, the gauge head 70 should not be always kept at the mount 43A in a state that the contacting elements 86 are inserted into the ring gauge 49A. For example, the gauge head 70 disposes over the mount 43A via a coil spring and the master ring gauge 49A is provided lower than the gauge head 70. Accordingly, when the gauge head 70 is attached to the Z-slider 15A or 15B against the coil spring, the zero adjustment may be done while the contacting elements 86 are inserted into the ring gauge 49A.

The X-sliders 14A and 14B, the Z-sliders 15A and 15B and the stocker 40A and 40B are not always necessary to be provided by two but enough to do by one. But, the double is effective for the smooth measurement.

The three dimensional movement of the gauge head 70 or the touch probe 90 with reference to the object W is not always necessary to be done by the X-sliders 14A and 14B, the Z-sliders 15A and 15B and the table 17, but by the Y-direction movement of the cross beams 13A and 13B with reference to the pair of columns.

The mounting frames 42A and 42B of the stockers 40A and 40B with reference to the Z-sliders 15A and 15B are not always necessary to be moved toward the Y-direction. The z-sliders 15A and 15B may alternatively move toward the Y-direction.

In the above embodiment, the Z-sliders 15A and 15B are supported by the columns 12 via the X-sliders 14A and 14B. But an alternative Z-slider may be organized by the cross beams 13A and 13B movable vertically along the columns 12 and the X-sliders 14A and 14B sliderable along such the cross beams.

The arrangement of the swing table 18 and the turn table 19 on the table 17 may be changed to another one in which the turn table is firstly provided on the table 17 and the swing table 18 is provided on such turn table 19.

The swing table 18 and the swing table 19 are not always necessary to be provided together but only one of them or no one may be provided occasionally.

The shank 78 of the gauge head 70 is not always necessary to be connected to the connecting plate 75 via two pairs of blade springs 74 and 77 but via an Oldham's coupling so as to move radially with a coil spring to coincide the center axis of the gauge body 71 with that of the shank 78. The gauge body 71 and the shank 78 may be connected by a cylindrical rubber band not to shift axially and radially. The floating mechanism is not always necessary to be employed. The gap between two axis may be amended by the movement of the Z-slider 15A or 15B.

The detachable system 50 may be of other one such as electro-magnet and the like.

The respective shapes and dimensions in the embodiment may be altered, if necessary.

Accordingly, the bores provided at the object are measured so smooth, so that an application toward the in-line measurement may be allowed.

The embodiments of the invention in which an exclusive property or privilege is claimed are defined as follows:

1. An automatic inner diameter measuring apparatus, comprising:
    at least one inner diameter measuring gauge head having at least one contacting element capable of being inserted into at least one bore of an object to be measured and moving in a radial direction of the bore;
    a stocker capable of holding said at least one inner diameter measuring gauge head corresponding to a diameter of the bore;
    three-dimensional moving means for detachably coupling with said inner diameter measuring gauge head and for facilitating a three-dimensional movement with reference to the object to be measured and said inner diameter measuring gauge head;
    drive means for said three-dimensional moving means;
    at least one master ring gauge for zeroing said at least one inner diameter measuring gauge head;
    a master ring gauge support means for holding said at least one master ring gauge said three-dimensional moving means with said inner diameter measuring gauge head coupled thereto orienting a central axis of said inner diameter measuring gauge head to a coaxial relationship with a central axis of said master ring gauge whereat a measuring procedure beings to measure said at least one bore in said object; and
    said master ring gauge support means is provided on said stocker, so that the central axis of said master ring gauge is coaxial with the central axis of said inner diameter measuring gauge head kept on said stocker when said inner diameter measuring gauge head protrudes downwardly through said master ring gauge.

2. The automatic inner diameter measuring apparatus according to claim 1 wherein said three-dimensional moving means includes an X-slider movable in an X-direction along a cross beam on columns upstanding on both sides of a base frame, a Z-slider provided on the X-slider movable in a Z-direction and a Y-slider movable in a Y-direction along rails on the base frame.

3. The automatic inner diameter measuring apparatus according to claim 2, wherein the Y-slider has thereon a swing table capable of swinging at a predetermined angle with reference to a swing axis thereof and a turn table mounted on said swing table capable of rotating at a predetermined angle with reference to an axis of rotation thereof.

4. The automatic inner diameter measuring apparatus according to claim 1, wherein said inner diameter measuring gauge head has a shank portion adapted to be coupled with said three-dimensional moving means and a gauge body, and wherein said gauge body is supported on said shank portion for movement radially with respect to said shank portion.

5. The automatic inner diameter measuring apparatus according to claim 1, wherein said stocker has at least one touch probe.

6. A method of zero adjustment for an automatic inner diameter measuring apparatus, comprising:
    at least one inner diameter measuring gauge head having at least one contacting element capable of being inserted into at least one bore of an object to be measured and moving in a radial direction of the bore;
    a stocker capable of holding said at least one inner diameter measuring gauge head corresponding to a diameter of said bore in said object;
    three-dimensional moving means for detachably coupling with said inner diameter measuring gauge head and for facilitating a three-dimensional movement with reference to the object to be measured and said inner diameter measuring gauge head;
    drive means for said three-dimensional moving means;
    at least one master ring gauge for zeroing said at least one inner diameter measuring gauge head;
    a master ring gauge support means for holding said at least one master ring gauge, so that the center axis of said master ring gauge coincides with that of said inner diameter measuring gauge head kept on said stocker said method comprising the steps of:

passing the contacting element of said inner diameter measuring gauge head through said master ring gauge when said inner diameter measuring gauge head is coupled with said three-dimensional moving means; and automatically adjusting an output value of said inner diameter measuring gauge head to zero when the contacting element passes through the master ring gauge whereby the contacting element of said inner diameter measuring gauge head projects by a predetermined dimension through said master ring gauge, so that when said inner diameter measuring gauge head is coupled with said three-dimensional moving means, and pulled up by the predetermined dimension, the output value of said inner diameter measuring gauge head is adjusted to zero.

* * * * *